United States Patent
Zhang et al.

(10) Patent No.: US 7,421,081 B2
(45) Date of Patent: Sep. 2, 2008

(54) METHOD AND APPARATUS FOR GENERATING HIERARCHICAL KEYS OF DIGITAL ASSETS

(75) Inventors: Jian Zhang, Shanghai (CN); Ling Shao, Beijing (CN); Yun Zhang Pei, Beijing (CN); Dong Xie, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 10/825,913

(22) Filed: Apr. 16, 2004

(65) Prior Publication Data

US 2004/0215661 A1    Oct. 28, 2004

(30) Foreign Application Priority Data

Apr. 22, 2003 (CN) ................. 03 1 23222

(51) Int. Cl.
*H04L 9/08* (2006.01)
*G09B 3/00* (2006.01)
*G09B 7/00* (2006.01)

(52) U.S. Cl. .............. 380/277; 434/322; 434/365; 726/27; 713/189

(58) Field of Classification Search ........... 380/277
See application file for complete search history.

(56) References Cited

U.S. PATENT DOCUMENTS

| | | | |
|---|---|---|---|
| 6,167,513 A * | 12/2000 | Inoue et al. ............ 713/150 |
| 6,895,503 B2 * | 5/2005 | Tadayon et al. ......... 713/168 |
| 7,095,850 B1 * | 8/2006 | McGrew ................. 380/42 |
| 7,103,185 B1 * | 9/2006 | Srivastava et al. ...... 380/277 |
| 7,240,365 B2 * | 7/2007 | de Jong et al. ............ 726/9 |
| 2002/0073047 A1 * | 6/2002 | Morrison ................ 705/71 |
| 2002/0150240 A1 | 10/2002 | Henson et al. ........... 380/44 |
| 2003/0081792 A1 * | 5/2003 | Nakano et al. ......... 380/286 |
| 2003/0159037 A1 * | 8/2003 | Taki et al. .............. 713/168 |
| 2003/0161474 A1 * | 8/2003 | Matsuzaki et al. ...... 380/277 |
| 2003/0204515 A1 * | 10/2003 | Shadmon et al. ....... 707/100 |
| 2004/0054681 A1 * | 3/2004 | Pitts ..................... 707/100 |
| 2004/0073903 A1 * | 4/2004 | Melchione et al. ...... 717/172 |
| 2004/0091103 A1 * | 5/2004 | Martin et al. ............ 380/28 |
| 2005/0060334 A1 * | 3/2005 | Kawamoto et al. ...... 707/102 |
| 2005/0119967 A1 * | 6/2005 | Ishiguro et al. ......... 705/38 |

* cited by examiner

*Primary Examiner*—Christian Laforgia
(74) *Attorney, Agent, or Firm*—Richard M. Goldman; Shimokaji & Associates, P.C.

(57) ABSTRACT

A method for generating hierarchical keys of digital assets, the digital assets are arranged as at least one tree structure for management, a root node of the tree structure represents the complete set of the digital assets, other group nodes represents sub-sets in each level of the digital assets respectively, and the nodes in the lowest level are leaf nodes, said method includes: generating the key of the root node; and starting with the key of the root node, using the key of a father node to compute level by level the keys of its child nodes according to a predetermined function, through to leaf nodes.

13 Claims, 4 Drawing Sheets

Note:
1 - Root node
2 - Non-root group node
3 - Leaf node

METHOD AND APPARATUS FOR GENERATING HIERARCHICAL KEYS OF DIGITAL ASSETS

BACKGROUND

1. Technical Field

The present invention relates to a method for managing keys of digital assets, in particular, to a method for generating hierarchical keys of digital assets.

2. Background Art

In recent years, many aspects of the daily lives of people have gone digital. In order to protect digital assets, cryptography has been widely used, and thus leading to the need of cryptographic key management. Since the amount of digital assets to be protected is constantly growing, the management of cipher keys is a challenge.

Cipher key management includes three basic features: (1) key generation: generating secure cipher keys for digital assets; (2) key storage: storing the cipher keys in a secure manner; and (3) key distribution: delivering the cipher keys to the legal users.

An example of key management is described below. Suppose that in a mature and reliable e-learning system, all lectures (teaching materials) should be ciphered with different keys, and all authorized users who have paid for these lectures should get the keys to the lectures. In a conventional method, a key management system first generates keys for each lecture, and then stores all of the keys in a database. When a user has paid for some assets, the key management system delivers the corresponding asset keys to the user.

The conventional key management system usually works well, but as the amount of digital assets becomes excessive, cipher key management can become quite costly. For example, if there are 100,000 lectures in the e-learning system, and a user subscribes and pays for 20,000 lectures therein, then 20,000 keys corresponding to these lectures should be securely delivered to the user. There are two possible ways to deliver these keys: (1) delivering the 20,000 keys in advance; and (2) delivering the key whenever the user needs. Obviously, the former is not flexible, since these lectures may be upgraded later, and there may be some supplemental lectures or some lectures may be combined, these changes cannot be automatically reflected in the 20,000 keys the user has already got, i.e., the user may not get those changed lectures. Compared to this, though the latter does not have the above disadvantages, it is quite costly, since a user may request up to 20,000 times in order to fetch all these keys.

There are two predominant kinds of key management systems in the protection of digital media: Conditional Access (CA) system for pay-TV and Digital Rights Management (DRM) system for the Internet. In CA systems, there is only one key for all the programs within one month, except for some special pay-per-view programs, so the user cannot subscribe to the programs for, e.g., a single day or even a single hour. CA thus lacks flexibility. In DRM systems, each time a user buys a content, the server retrieves the key of the content, but when the volume of users and assets becomes excessively large, the load on the server becomes quite heavy. A main problem of both CA and DRM systems is that they focus on the key storage and distribution, not the key generation.

SUMMARY OF THE INVENTION

In order to solve the problems in the above-mentioned CA system and DRM system, it is an object of the present invention to provide a method for generating hierarchical keys of digital assets. In the hierarchical key generating method of the present invention, all the assets are managed in a tree structure, wherein the tree structure comprises group nodes and leaf nodes, each group node including a root node and other group nodes being non-root nodes, and each node corresponds to different collections in the digital assets.

Each higher level node is called a father node of its lower node, and each lower node is called a child node of its higher node. In the present invention, only the key of the root node is given randomly, while the keys of other nodes can be obtained by computing by using a one-way function according to the key of the father nodes of the nodes.

Therefore, in order to achieve the above object, the present invention provides a method for generating hierarchical keys of digital assets, comprising the steps of: arranging the digital assets as at least one tree structure for management, a root node of the tree structure representing the complete set of the digital assets, other group nodes representing sub-sets in each level of the digital assets respectively, and the nodes in the lowest level being leaf nodes; generating the key of the root node; and starting with the key of the root node, using the key of a father node to compute level by level the keys of its child nodes according to a predetermined function, through to leaf nodes.

The present invention also provides an apparatus for generating hierarchical keys of digital assets, comprising: a key tree management unit for arranging the digital assets as at least one tree structure for management, a root node of the tree structure representing the complete set of the digital assets, other group nodes representing sub-sets in each level of the digital assets respectively, and the nodes in the lowest level being leaf nodes, the apparatus further comprising: a root node generating unit for generating the key of the root node; and a computing unit for starting with the key of the root node, using the key of a father node to compute level by level the keys of its child nodes according to a predetermined function, through to leaf nodes.

The present invention also provides a server apparatus for managing hierarchical keys of digital assets, comprising: a key tree management unit for arranging the digital assets as at least one tree structure for management, a root node of the tree structure representing the complete set of the digital assets, other group nodes representing sub-sets in each level of the digital assets respectively, and the nodes in the lowest level being leaf nodes, said server apparatus further comprises: a root key generating unit for generating the key of the root node; a first computing unit for starting with the key of the root node, using the key of a father node to compute level by level the keys of its child nodes according to a predetermined function, through to leaf nodes; and an encrypting unit for encrypting corresponding digital assets by using directly or indirectly the computed node keys.

The present invention also provides a client apparatus for utilizing hierarchical keys of digital assets, wherein the digital assets are arranged as at least one tree structure for management, a root node of the tree structure representing the complete set of the digital assets, other group nodes representing sub-sets in each level of the digital assets respectively, and the nodes in the lowest level being leaf nodes, said client apparatus comprises: a second computing unit for, based on a node key received from a server apparatus, computing the keys of the nodes in lower levels of said node through to leaf nodes in turn by using a predetermined function; and a decrypting unit for decrypting the digital assets contained in all nodes by using the computed keys of all nodes.

Although the present invention provides a method for generating keys, it is also very useful for key storage and key distribution. The amount of the keys generated according to the method of the present invention is greatly reduced, thereby saving a lot of costs needed for key storage and distribution, and having enough flexibility to support such changes as the insertion and deletion of assets.

BRIEF DESCRIPTION OF THE DRAWINGS

The above features and advantages of the present invention will become more apparent through the following detailed description of a specific embodiment of the present invention, in conjunction with the drawings, in which.

DETAILED DESCRIPTION

The best modes for carrying out the present invention will be described hereinafter in conjunction with the drawings.

Figure 1:
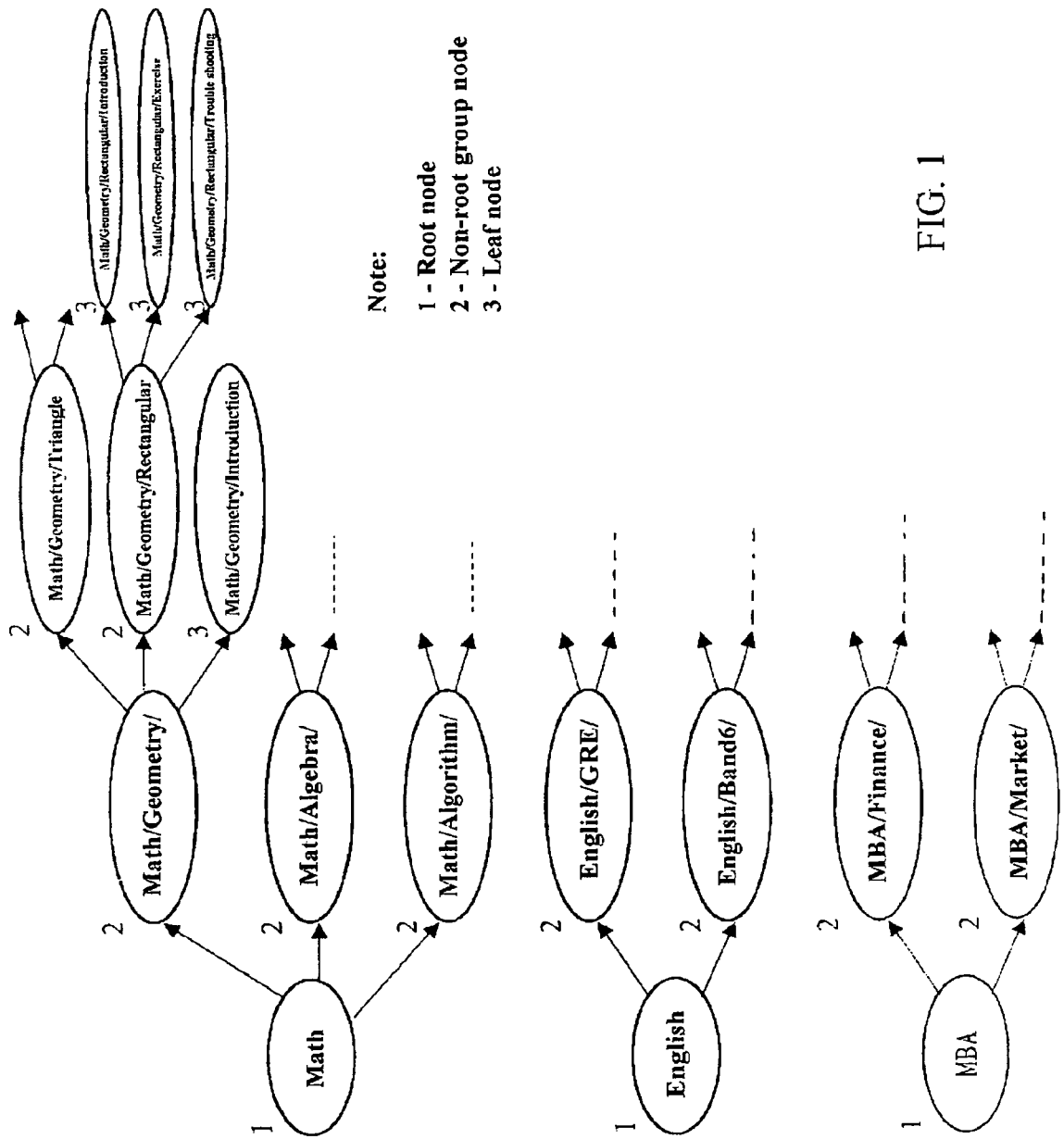
FIG. 1 is a schematic diagram of performing tree structure management on assets according to the present invention.

FIG. 1 is a schematic diagram of performing tree structure management on the assets in an e-learning system according to the present invention.

In the e-learning system of FIG. 1, all the lectures are digitalized, and are organized as lectures in a tree structure. In the present invention, these digital lectures are all referred to as digital assets. In addition, the digital asset can be at least one of video, audio and text materials. Wherein, a node marked with 1 is a root node, which represents a main course, such as math, English or MBA course, etc. A node marked with 2 is a non-root group node (which can also be referred to as a child node). Each non-root group node represents a sub-course under the main course, such as nodes "math/geometry/" and "math/algebra/" subdivided under the main course node "math/", and nodes "math/geometry/triangle/" "math/geometry/rectangle/" subdivided under the node "math/geometry/", etc. The root nodes and the non-root group nodes both can be referred to as group nodes. And a node marked with 3 is an asset node (which is also referred to as a leaf node, the lowest level of the tree structure), which includes various specific lectures in various courses, such as asset nodes "math/geometry/rectangle/introduction", "math/geometry/rectangle/exercise" and "math/geometry/introduction", etc.

In order to organize these assets into the tree structure, three basic functions are required: (1) creating a root node which can be either a group node or an asset node (i.e., leaf node); (2) creating a group node in the lower level under a group node; (3) creating an asset node under a group node.

In addition, a group node can have a plurality of sub-nodes in multiple levels, in which the higher level node is referred to as the father node of the lower level node, and the lower level node is referred to as the child node of the higher level node. These child nodes can be either group nodes or asset nodes. The asset node includes specific digital assets (such as lectures), and it does not have child nodes. It can be seen from FIG. 1 that the asset management is similar to the ordinary file system, but it can have a plurality of root nodes. The key management of the above-mentioned e-learning system will become very easy. If a user demands for a course, he/she needs to simply get a key of the course, i.e., the key of a certain group node instead of all keys of various sub-courses under this course. If the user demands for only three lectures, he/she does not need to subscribe the whole course, three individual lecture keys should be enough for the user.

For example, in FIG. 1, if the root node "math/" has a key $K1$, then the group node "math/geometry/" will have a key $K2=F(K1,$ "math/geometry/"). And the node "math/geometry/rectangle/" will have a key $K3=F(K2,$ "math/geometry/rectangle/"). The last asset node (i.e., leaf node) "math/geometry/rectangle/introduction" will have key $K4_1=F(K3,$ "math/geometry/rectangle/introduction"). Likewise, the asset node "math/geometry/rectangle/exercise" will have a key $K4_2=F(K3,$ "math/geometry/rectangle/exercise"), and the asset node "math/geometry/rectangle/q&a" will have a key $K4_3=F(K3,$ "math/geometry/rectangle/q&a").

For example, in the above various keys, $K4_1$ or a part of $K4_1$ or the result derived from calculating $K4_1$ is used to encrypt assets in the asset node "math/geometry/rectangle/introduction", i.e., the lecture corresponding to the node.

Of course, a cipher key can be assigned in advance to the asset node such as "math/geometry/rectangle/exercise" randomly or by other unit, then the cipher key assigned in advance is encrypted by using $K4_1$ or a part of $K4_1$ or the result derived from calculating $K4_1$.

In the embodiment of the present invention, the corresponding digital assets, i.e., the lectures, can be stored at the position of each group node, so as to the digital assets stored at the position of the corresponding node are decrypted by using directly or indirectly the keys $K1$, $K2$, $K3$ or $K4$.

Here, $F(\ )$ is a one-way function representing an algorithm, the reverse algorithm of which is not computable. For example, $y=F(x)$ is quite easy to compute, while the reverse function $x=F^{-1}(y)$ is quite impossible to compute. In addition, in the present invention, the one-way function $F(\ )$ can be provided by the server side to the client side, or can be embedded in the client without being provided by the server side to the client side.

It is clear if a user has any one of keys $K1$, $K2$, $K3$ and $K4$ (asset node keys $K4_1$, $K4_2$ and $K4_3$ are referred to as $K4$ as a whole below), he/she can decrypt the assets (i.e., specific lectures) contained in the descendent nodes of the nodes corresponding to the key. In general, if a key of a group node is given, then in fact the keys of all the descendant nodes of the group node are given, since the user can compute all the keys of the descendent nodes of the node from the key of the node. For example, the user can compute the keys $K4_1$, $K4_2$, $K4_3$ of descendent asset nodes of the node key $K3$ from the node key $K3$. Thus if a user is entitled to a group of assets, then simply giving him/her the key of the group node is enough.

For example, if user A is assigned with a group key $K3$, then user A can decrypt any assets under the group node "math/geometry/rectangle/" including of course various assets to be changed in the future (such as modified, added or deleted, etc.). For example, even if there is no asset "math/geometry/rectangle/future" in the system now, user A can decrypt the asset as soon as it becomes available, while no extra key distribution will be needed, and this saves a lot of cost for the future key distribution.

A system embodying the present invention will be described hereinafter in conjunction with FIG. 2.

Figure 2:
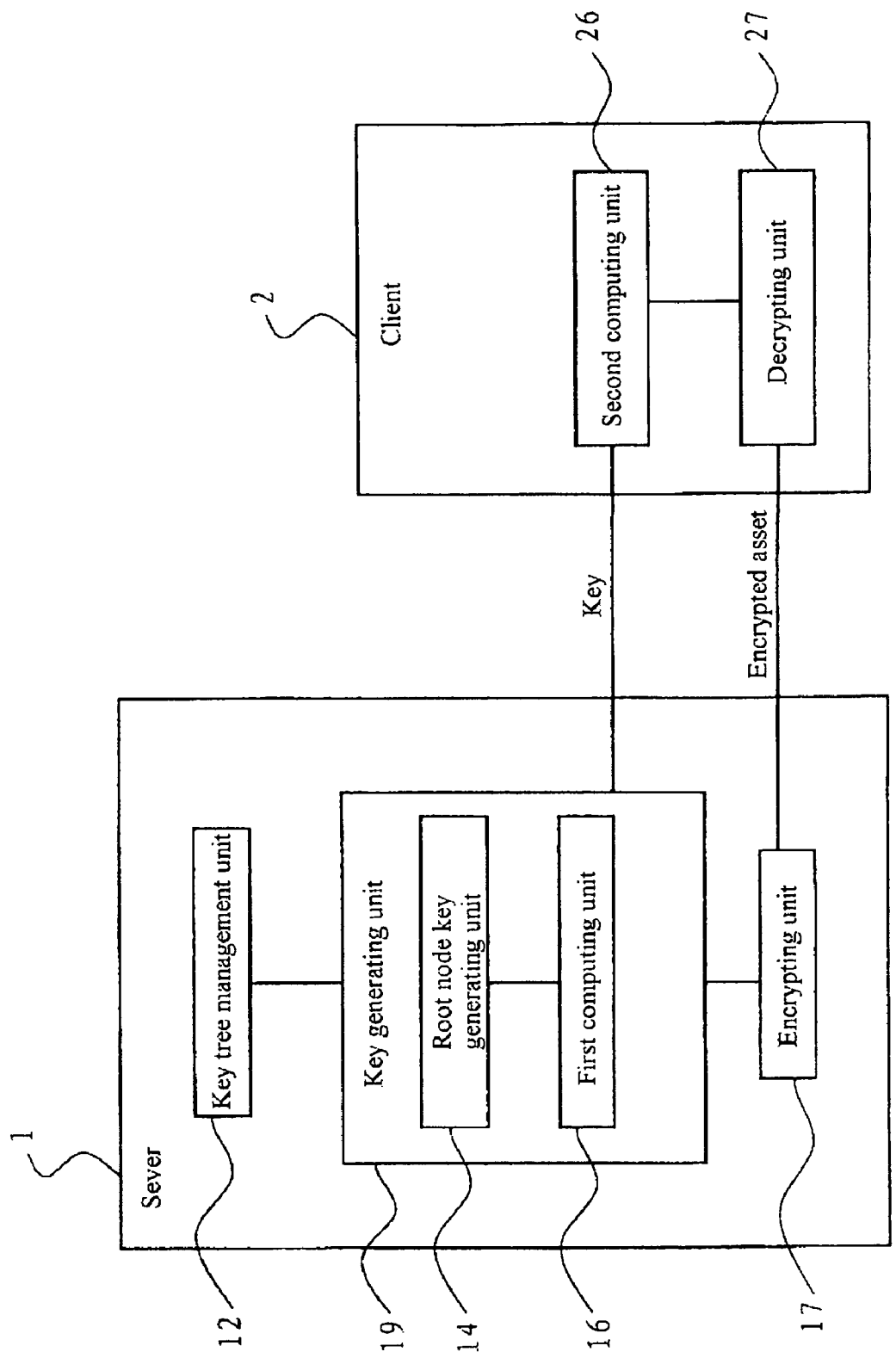
FIG. 2 is a schematic diagram of a system embodying the present invention.

FIG. 2 is a schematic diagram of a system embodying the present invention.

The system in FIG. 2 can be for example an e-learning system (of course the systems of other usage can also be suitable) comprising a server 1 and a client 2 connected with each other. Of course the server 1 and the client 2 can also be connected with each other through such a network (not shown) as the Internet, an enterprise network or an LAN.

In addition to such general units as a CPU, a bus and a memory (ROM, RAM etc.) (not shown), the server 1 also comprises a key generation unit 19 for generating needed keys. The key generation unit 19 comprises a root node key generating unit 14 for generating a root node key randomly or by other means; and a first computing unit 16 for using a function such as an one-way function to compute level by level the keys of various sub-nodes of the root node, through to leaf nodes, based on the root node key. In the meantime, the server 1 also comprises an encrypting unit 17 for using the computed key to encrypt the assets in corresponding nodes, such as teaching lectures and etc. (in addition, a cipher key is assigned in advance to an asset node such as "math/geometry/rectangular/introduction" randomly or by other means, then the cipher key assigned in advance is encrypted by using the result derived from performing calculation on the computed key using all or a part of the computed keys); and a key tree management unit 12 for creating a key tree structure, maintaining the created tree structure, and storing and managing the computed keys.

In addition, the sever 1 also comprises a first communication port (not shown) for receiving a request from the client 2 through a corresponding connection line or a network, and transmitting the requested contents and keys, etc. to the client 2.

In addition to such general units as CPUs, bus and memory (ROM, RAM etc.) (not shown), the client 2 also comprises a second computing unit 26 for using an algorithm program received from the server 1 or embedded internally to compute the keys of needed sub-nodes level by level based on the node keys received from the server 1, so as to compute finally the key of the needed asset node; and a decrypting unit 27 for decrypting the needed assets such as teaching lectures by using the computed keys of the nodes.

In addition, the client 2 also comprises a second communication port (not shown) for transmitting a request to the server 1 through a corresponding connection line or a network, and receiving the requested contents and keys, etc. from the server 1.

Of course, in the communication between the above server 1 and client 2, the encrypted assets and the node key needed by the client 2 can be transmitted simultaneously by the server 1 to the client 2, or can be transmitted separately. For example, in the present invention, the server 1 only transmits a corresponding node key to the client 2 upon its request, the encrypted assets and etc. can be transmitted to the client 2 at other time by other means, e.g., the encrypted assets can be transmitted to the client 2 via an optical disc, etc.

The above first computing unit 16 and second computing unit 26 can be implemented by executing a corresponding software program on the CPU, or can be implemented by a hardware obtained by solidifying a certain software program into the unit such as a CPU. In addition, the root node key generating unit 14, the first computing unit 16 and the encrypting unit 17 in the server 1 are not limited to the above mentioned configuration, but can be implemented by only one unit integrating their functions together. The root node key generating unit 14 and the first computing unit 16 therein are also not limited to the above-mentioned configuration, and they may not be contained in the key generation unit 19, but can be independent from the key generation unit 19. The second computing unit 26 and the decrypting unit 27 in the client 2 are not limited to the above-mentioned configuration, but can be implemented by only one unit integrating their functions together.

In addition, the above units are not limited to only being contained in the server 1 and the client 2 respectively, but can be arranged outside the server 1 or the client 2 in an operable connection manner.

The key management method of the present invention will be described in details hereinafter in conjunction with FIG. 3.

Figure 3:
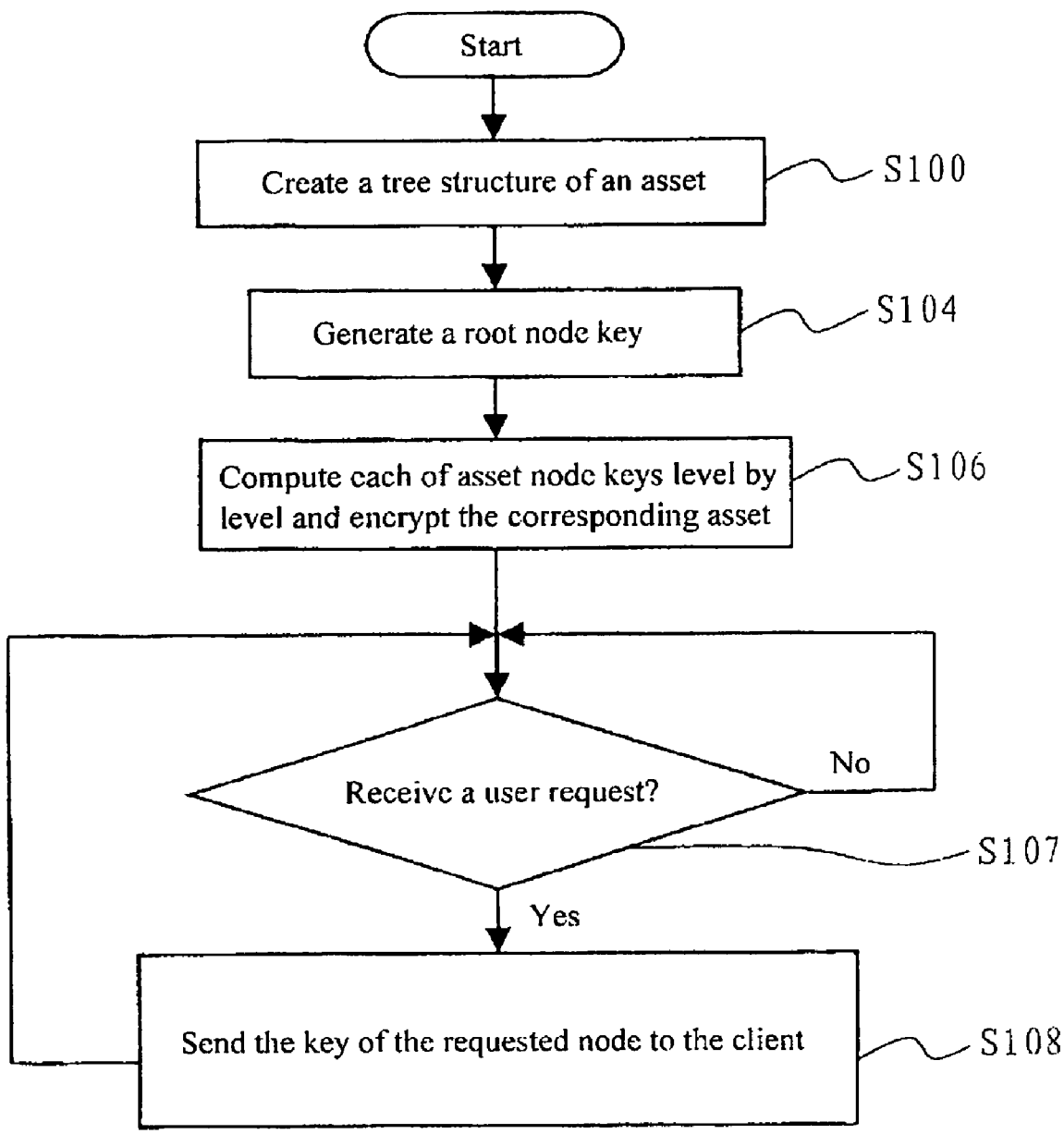
FIG. 3 is a flow chart showing a method for performing key management in server 1 according to the present invention.

FIG. 3 is a flowchart showing a method for performing key management in the server 1 according to the present invention.

In which, at step S100, the key tree management unit 12 creates the tree structure of assets. A plurality of tree structures can be created according to the category and size of the assets, as shown in FIG. 1. Then the process proceeds to step S104.

At step S104, the root node key generating unit 14 in the server 1 generates the key K1 of the root node of the asset tree structure, and transmits the key K1 to the first computing unit 16. The root node key K1 can be generated randomly or by other means of course.

Then at step S106, the first computing unit 16 computes level by level the keys of sub-nodes, through to the key K4 ($K4_1$, $K4_2$ and $K4_3$) of the asset node (i.e., leaf node), by using an one-way function F( ) based on the generated root node key K1, and encrypts the corresponding assets by using the computed asset node key K4 or a part of K4. Specifically, the first computing unit 16 first, based on the generated root node key, computes the key of the sub-node (maybe a group node) of the root node, here it is the key K2 of the group node "math/geometry/" by using an one-way function, and then computes, based on the group node key K2, the key of the sub-node of the group node (maybe another group node or a asset node), here it is the key K3 of the group node "math/geometry/rectangular/". Computation is performed like this level by level until the final asset node key K4 (including $K4_1$, $K4_2$ and $K4_3$) is obtained.

After obtaining the final key K4 of the asset node, the server 1 encrypts the assets included in the nodes by using corresponding node keys.

In the above mentioned computing process, the computing procedures for computing the keys of the nodes can be identical or different. In addition, even if all the nodes have the same father node, the obtained keys of these nodes are also different. For example, though asset nodes "math/geometry/rectangular/introduction", "math/geometry/rectangular/exercise" and "math/geometry/rectangular/q&a" have the identical father node "math/geometry/rectangular/", the keys $K4_1$, $K4_2$ and $K4_3$ they possess respectively are different from each other, thereby ensuring each asset has higher security.

Next, the process proceeds to step S107. At step S107, the server 1 determines whether or not a request for certain assets is received from the client 2. And if no request for certain assets is received from the client 2, then the server 1 continues to be in a standby state until receiving a request from the client 2.

If it is determined at step S 107 that a request for certain assets is received from the client 2, such as a request for the asset in the node "math/geometry/rectangular/introduction", then the process proceeds to step S108.

Next at step S108, the server 1 transmits the corresponding key of the node requested by the client 2 to the client 2. Of course, the encrypted assets requested by the client 2 can be transmitted to the client 2 collectively or separately.

After finishing the process at step S108, before the process in the server 1 returns to step S107, the process is in a standby state to wait for receiving next user request.

Of course, in the embodiment in the present invention, after the server 1 receives the request from the client 2, an authentication process can be included for checking whether the client 2 having sent the request is a legal user of the requested asset, e.g., whether the client 2 has paid for its requested asset, etc.

In addition, in the embodiment of the present invention, the server 1 can, in the course of the above process, also accept instructions from an administrator through an input interface (not shown), modify the asset tree structure and perform adding/amending/deleting processes on the contents of the asset according to the instructions of the administrator, and perform such processes as regenerating a root key, computing the keys of various nodes in various levels and encrypting the modified asset content, etc. according to the modified asset tree structure.

The application of the key management method of the present invention in the client 2 will be described hereinafter in conjunction with FIG. 4.

Figure 4:
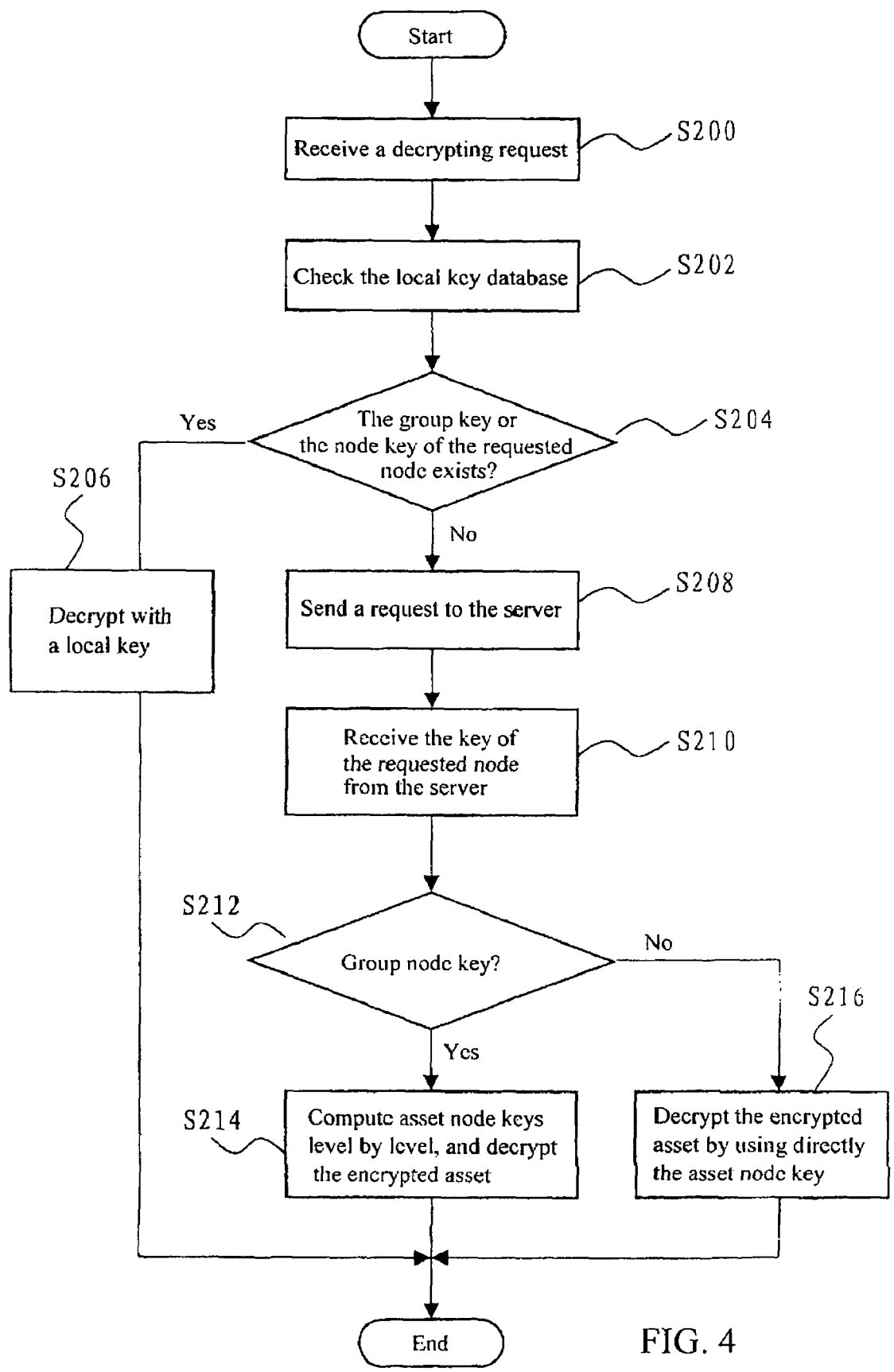
FIG. 4 is a flow chart showing a method for performing key management in client 2 according to the present invention.

FIG. 4 is a flowchart showing a method for performing key management in the client 2 according to the present invention.

In FIG. 4, at step S200, the client 2 receives, through an input unit (not shown) from a user, a request for decrypting a certain encrypted asset, such as assets in the node "math/geometry/rectangular/". After receiving the request, at step S202, the client 2 checks a local key database (not shown) to determine whether or not a key for decrypting the encrypted asset requested by the user, such as key K3, is stored in the local key database. In the above key database stored all the keys received previously from the server 1 by the client 2. Then the process proceeds to step S204.

At step S204, the client 2 determines whether or not there stored in the local key database the asset node key K3 for decrypting the asset in the node "math/geometry/rectangular/", or the group keys of its various higher level nodes.

If at step S204 it is determined that the asset node key K3 for decrypting the assets in node "math/geometry/rectangular" is stored in the local key database of the client 2, then the locally stored node key K3 is used to decrypt the assets in the corresponding node "math/geometry/rectangular/". In addition, if necessary, for example if the asset node key K4 is still needed to decrypt the assets of the lower level node of the node "math/geometry/rectangular/" such as the assets in the asset node "math/geometry/rectangular/introduction", then the second computing unit 26 computes the needed asset node key K$4_1$ by using the locally stored node key K3, and decrypts the corresponding assets by using the asset node key K$4_1$.

If the key of the group node in the upper level including the requested node is stored in the key database of the client 2, then second computing unit 26 computes the key K3 of the needed asset node level by level by using the locally stored group node key K1 or K2, computes, if necessary, the asset node key K$4_1$, and decrypts the corresponding assets by using the node key K3 and asset node key K$4_1$.

If at step S204 it is determined that no requested group key or node key K3 is stored in the key database of the client 2, then the client 2 at step 208 sends a request for key K3 to the server 1. Then the process proceeds to step S210.

After the server 1 authenticates that the client 2 is a legal user, at step 210, the client 2 receives the key K of the corresponding node from the server 1, which may be either K3 or a higher level group node key of K3, such as K1 or K2.

At step S212, the client 2 determines that the received key K is either the requested node key or the key of its higher level group node.

If it is determined that the received key K is the key of the upper level group node (in the embodiment of the present invention, it is determined to be Key K3 of the group node "math/geometry/rectangular/"), then at step S214, according to the received key K3, the keys of asset nodes corresponding to the requested asset, such as K$4_1$, K$4_2$ or K$4_3$, are computed level by level by using an internally embedded algorithm program in the client 2, and the requested assets are decrypted by using the computed asset node key K$4_1$, K$4_2$ or K$4_3$ as well as the received node key K3. The above mentioned process of computing keys level by level is identical to that of step S106 in the server 1, so the detailed description thereof is omitted.

If at step S212 it is determined that the received key is the requested asset node key, e.g., when the client 2 requests to decrypt the asset node "math/geometry/rectangular/introduction", the node key received from the server 1 is K4, then the process proceeds to step S216. At step S216, the client 2 determines that the received node key is the key K$4_1$ of the requested asset node, so the client 2 no longer computes level by level, but directly uses the received key K$4_1$ to decrypt the obtained encrypted asset.

In the above process of determining which node key corresponds to the received node key, it can be performed by using the ID which is added into the key by the server 1 when generating the key, of course it can also be performed by using other means known by those skilled in the art.

The above mentioned method of the present invention for generating root node keys can also be as follows, i.e., the server 1 does not store in advance the key of corresponding root node and all level keys computed level by level before receiving the request of the client 2, but generates the key of the root node and then computes all level keys level by level after receiving the request of client 2.

It can be known from the above description that, in the method of the present invention, since it is enough that the server 1 stores only the key of the root node before receiving a request from the client 2, or does not need to store the keys at all, the method of the present invention can reduce the storage requirement for asset keys. And the distribution of keys is also simplified: suppose a user is entitled to use 20,000 assets, he/she only needs to obtain several (may be 20, for example) group node keys instead of 20,000 keys. Thereby the need of bandwidth for transmitting keys over a network is greatly reduced, and a lot of costs needed for key storage and key distribution are saved.

Program Product

The invention may be implemented, for example, by generating the hierarchical keys of the digital assets through a software application (as database management system or content management system element), a dedicated processor, or a dedicated processor with dedicated code. The software application executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for generating hierarchical keys of digital assets.

This signal-bearing medium may comprise, for example, memory in server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++".

Additionally, the program code may, for example, be compressed, encrypted, or both, and may include executable files, script files and wizards for installation, as in Zip files and cab files. As used herein the term machine-readable instructions or code residing in or on signal-bearing media include all of the above means of delivery.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for generating hierarchical keys of digital assets, encrypting the digital assets in a digital asset server, and utilizing the keys of the digital assets and the encrypted digital assets in an associated digital asset client, comprising the steps of:

digitizing and organizing lectures in an e-learning system to produce the digital assets arranging the digital assets in the digital asset server as at least one tree structure, a root node of the tree structure representing a complete set of the digital assets, other group nodes representing sub-sets in each level of the digital assets respectively, and the nodes in the lowest level being leaf nodes; wherein a text string identifying a node in the tree structure is generated by appending text to a text string identifying the node's parent node;

randomly generating key of the root node in the digital asset server; starting with the key of the root node, using the key of a father node to compute level by level computed keys of its child nodes through to leaf nodes using a one way function, in the digital asset server; wherein the one way function is responsive to the text string identifying a node;

encrypting corresponding digital assets in the digital asset server using the computed keys;

providing the one way function at the digital asset client either by communicating from the digital asset server to the digital asset client or by embedding the one way function at the digital asset client;

requesting an encrypted digital asset at the digital asset client, and determining if a key for the requested encrypted digital asset is present on the digital asset client;

if the digital asset key is not present on the digital asset client, the digital asset client requesting the digital asset key from the digital asset server;

the digital asset server receiver requests from the digital asset client, and thereafter transmits a digital asset key, if requested, and a requested encrypted digital asset from the digital asset server to the associated digital asset client; and receiving the key and the encrypted digital asset from the digital asset server at the digital asset client and decrypting the encrypted digital asset utilizing the key;

generating, at the digital asset client, keys for descendent nodes of a group node, responsive to the group node's key and the one way function.

2. The method according to claim 1, comprising computing different keys for two nodes having the same father node.

3. The method according to claim 1, comprising computing different keys for child nodes having the same father node.

4. The method according to claim 1, comprising encrypting the corresponding digital assets using at least a part of the generated node keys.

5. The method according to claim 4 comprising encrypting the digital assets using a cipher, and encrypting the cipher using at least a part of the generated node keys.

6. An apparatus for managing digital assets consisting of digitized lectures in an e-learning system and hierarchical keys of the digital assets, comprising a digital asset server and a digital asset client:

said digital asset server comprising a central processor unit, a bus, and memory, and further comprising:

(a) a key tree management unit for arranging the digital assets as at least one tree structure for management, a root node of the tree structure representing the complete set of the digital assets, other group nodes representing sub-sets in each level of the digital assets respectively, and the nodes in the lowest level being leaf nodes, said apparatus further comprises:

(b) a root node key generating unit for generating the key of the root node; and (c) a first computing unit for starting with the key of the root node, using the key of a father node to compute level by level the keys of its child nodes according to a predetermined one-way function, through to leaf nodes;

(d) an encrypting unit for encrypting the corresponding digital assets by using at least a part of the generated node keys;

(e) an input interface unit for accepting instructions from an administrator; the instructions comprising: modifying the tree structure, changing content of the asset, regenerating a root key and computing a cipher key at a note;

wherein said root node represents a main course and said leaf nodes represent lectures in various courses; and said digital asset client comprising a central processor unit, a bus, and memory, and further comprising:

(a) a second computing unit for requesting an encrypted digital asset from the digital asset server, searching for node keys stored on the digital asset client for the requested digital asset, and, computing the keys of the nodes in lower levels of said node through to leaf nodes in turn; and (b) a decrypting unit for decrypting the digital assets contained in all nodes by using the computed node keys of all nodes of the requested digital assets; wherein the decrypting unit generates keys for descendent nodes of a group node using the group node's key and the predetermined one-way function.

7. The apparatus according to claim 6, adapted for computing different keys for different nodes having the same father node.

8. The apparatus according to claim 6, further comprising an encrypting unit for encrypting the digital assets first by using a cipher, and then encrypting the cipher by using at least a part of the generated node keys.

9. A program product comprising media including a machine-readable data storage medium selected from the group consisting of magnetic hard drives, RAID arrays, RAMACs, a magnetic data storage diskettes, magnetic tape, digital optical tape, RAMs, ROMs, EPROMs, EEPROMs, and flash memories, having computer readable instructions written thereon for directing a computer to perform a process for generating hierarchical keys of digital assets and encrypting the digital assets in a digital asset server, and utilizing the keys of the digital assets and the encrypted digital assets in an associated digital asset client, comprising the steps of:

creating the digital assets by digitizing lectures;

arranging the digital assets in the digital asset server as at least one tree structure, a root node of the tree structure representing a complete set of the digital assets, other group nodes representing sub-sets in each level of the digital assets respectively, and the nodes in the lowest level being leaf nodes;

randomly generating, responsive to a text string identifying the root node, a key of the root node in the digital asset server; and starting with the key of the root node, using the key of a father node to compute level by level computed keys of its child nodes through to leaf nodes using a one way function, in the digital asset server;

providing a one-way function from the digital asset server to the digital asset client;

checking by an authentication process if a digital asset client requesting an asset is a legal user of the asset;

accepting instructions from an administrator through an input interface; the instructions comprising one or more of: modifying the tree structure; adding, amending, or deleting asset contents; regenerating a root key; computing keys of various nodes at various levels; and encrypting modified asset content;

transmitting a key and an encrypted digital asset from the digital asset server to the associated digital asset client; and receiving the key and the encrypted digital asset from the digital asset server at the digital asset client and decrypting the encrypted digital asset utilizing the key.

10. The program product according to claim 9, said process comprising computing different keys for two nodes having the same father node.

11. The program product according to claim 10, said process comprising encrypting the corresponding digital assets using at least a part of the generated node keys or their deformation.

12. The program product according to claim 11 said process comprising encrypting the digital assets using a cipher, and encrypting the cipher using at least a part of the generated node keys.

13. The program product according to claim 9, said process comprising computing different keys for child nodes having the same father node.

* * * * *